FIG. 2
SANDSTONE PLUS FLUID

FIG. 3
SANDSTONE PLUS FLUID

WILLIAM R. MILLS, JR.
INVENTOR.

BY *Arthur F. Zobel*

ATTORNEY

WILLIAM R. MILLS, JR.
INVENTOR.

BY Arthur F. Zobel

ATTORNEY

United States Patent Office 3,373,280
Patented Mar. 12, 1968

3,373,280
PULSED RADIOACTIVE WELL LOGGING METHOD FOR MEASUREMENT OF POROSITY AND SALINITY
William R. Mills, Jr., Dallas, Tex., assignor to Mobil Oil Corporation, a corporation of New York
Filed Dec. 18, 1963, Ser. No. 331,502
16 Claims. (Cl. 250—83.3)

This invention relates to radioactive analysis of materials of interest and more particularly to the measurement of porosity and salinity in formations of interest and has for an object the provision of a pulsed radioactive well logging method of and system for obtaining separate measurements of the decay constant or mean life of secondary radiation passing into a borehole from the formations by way of two separate paths through the formations of different distances and combining the measurements to obtain a measure primarily of porosity which is employed to accurately determine salinity.

In radiation analysis, quantities, such as the decay constant, the mean life, or half life, are measured to identify unknown elements present in the materials of interest. For example, in pulsed neutron well logging, the decay constant or mean life of thermal neutrons is measured to determine whether salt water or oil is present in the formations. More particularly, in one known technique the formations are irradiated with bursts of fast neutrons from a single source for the production of thermal neutrons. The thermal neutrons formed diffuse in the formation until they are captured while others pass into the borehole and are detected by a single detector employed in the borehole unit. The thermal neutron lifetime or decay constant is determined from the intensity of thermal neutrons or capture gamma rays detected after each burst of fast neutrons.

Two important factors which affect the thermal neutron lifetime are the salinity of the formation water and the thermal neutron-capture cross section of the chlorine of sodium chloride. In addition, another influencing factor is the porosity of the formations. In salt water formations of high porosity and high salinity, the thermal neutron lifetime measured will be low. Thus, in the logging of formations known to be free of fresh water, one generally looks for relatively long thermal neutron lifetime as an indication of low salinity and therefore oil. It has been found, however, that a relatively long thermal neutron lifetime can also be obtained in salt water formations of high salinity and low porosity. It is desirable, in fact, necessary, to distinguish formations of high porosity and low salinity from formations of high salinity and low porosity and a measure of the thermal neutron lifetime alone by the above technique employing a single detector is not sufficient. Such a measure does not give sufficient information about porosity.

In accordance with the present invention, a pulsed neutron logging system and method are provided for obtaining information about porosity as well as salinity, thereby enabling one to accurately determine the formation fluid conditions. More particularly, the method comprises the steps of irradiating the formations with bursts of primary radiation spaced in time for the production of secondary radiation. Secondary radiation is detected which passes from the formations and into the borehole by way of a path through the formations of a first distance. In addition, secondary radiation of the same nature is detected and which passes from the formations into the borehole by way of a path through the formations of a second and different distance. First and second functions are produced which are indicative of the decay constants of detected secondary radiation passing respectively over the first and second distances. These functions are combined to obtain a measurement of a parameter indicative of the elements of interest.

A system for carrying out this method comprises a logging tool containing a pulsed radiation source for irradiating the formations with bursts of primary radiation spaced in time for the production of secondary radiation. Also included in the tool are first and second detectors spaced from the source by different distances to detect at different locations secondary radiation of the same nature passing from the formations into the borehole. A first means produces a first function characterizing the secondary radiation detected by the first detector at a first location relative to the formation irradiated and within at least one predetermined time period following each burst of primary radiation. In addition, a second means produces concurrently with the first function a second function characterizing the secondary radiation detected by the second detector at a second location relative to the formations irradiated and within a predetermined time period following each burst of primary radiation. The two functions produced are employed to obtain measurements of a parameter indicative of elements of interest and to reduce the effect of other elements present.

In a more particular aspect, a first measurement is produced which is representative of the secondary radiation detected by the first detector at a plurality of separate time periods following each burst of primary radiation. In addition, a second measurement is produced concurrently which is representative of the secondary radiation detected by the second detector at a plurality of separate time periods following each burst of primary radiation. From the first and second measurements there are produced respectively first and second functions indicative of the decay constant of secondary radiation detected respectively by the first and second detectors for comparison.

In a preferred embodiment, the source employed emits bursts of fast neutrons and the first and second detectors are detectors of thermal neutrons. The first and second functions produced are indicative of the decay constant of thermal neutrons detected respectively by the first and second detectors and are compared to obtain a resultant measurement indicative primarily of porosity and substantially free from the effect of chlorine. This resultant measurement is employed with the measurement obtained by one of the two detectors to obtain information about salinity.

For further objects and advantages of the present invention and for a more complete understanding thereof, reference may now be had to the following detailed description taken in conjunction with the accompanying drawings wherein.

Figures 1, 5:
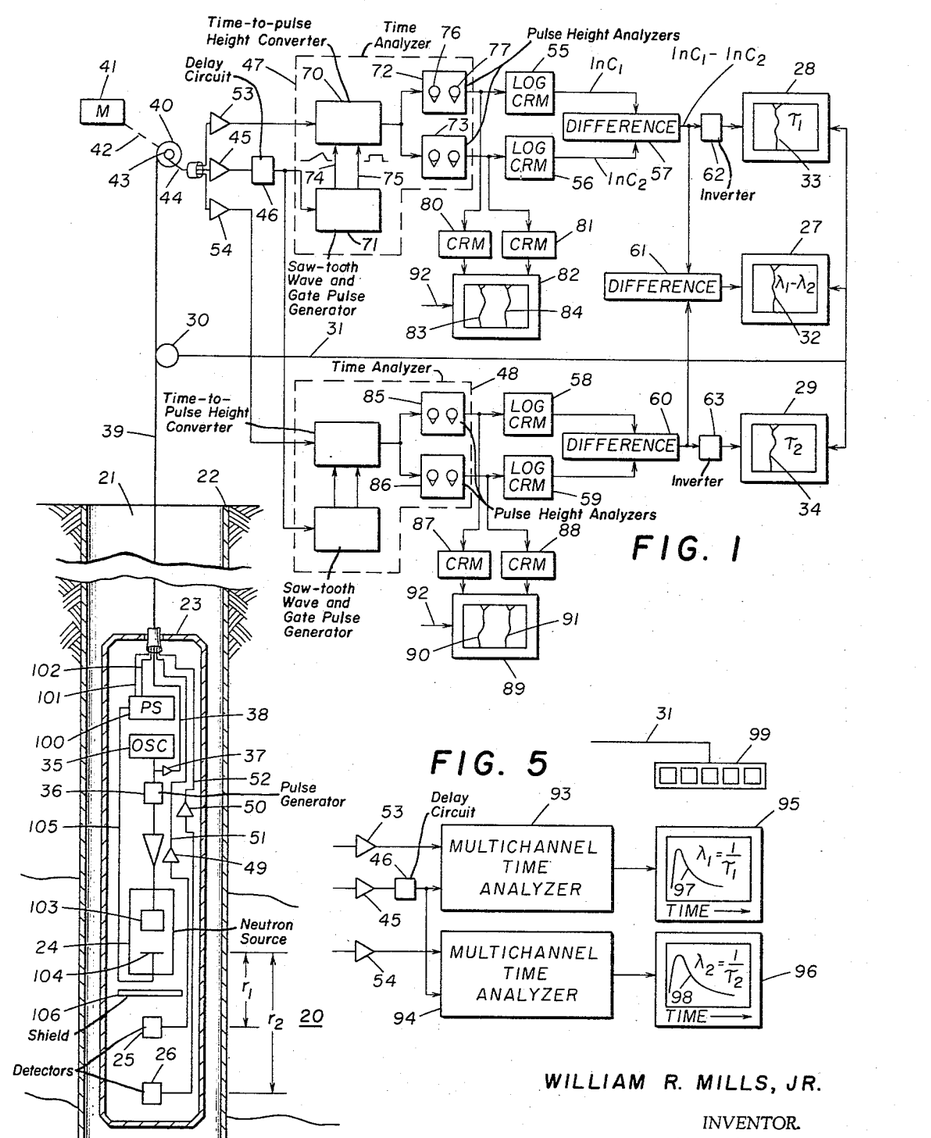
FIGURE 1 represents a system for investigating the formations traversed by a borehole.
FIGURE 5 illustrates a modification of the system of FIGURE 1.

Referring now to FIGURE 1 of the drawings, there will be described the method and system of the present invention for investigating unknown elements. In this illustration, the unknown elements of interest are those present in the formation fluids, for example, the fluids in formation 20 traversed by a borehole 21 lined with iron casing 22. In carrying out the method, the formation 20 is irradiated with bursts of primary radiation spaced in time for the production of secondary radiation. The secondary radiation passing into the borehole 21 is detected at two spaced locations in the borehole. To carry out these operations there is provided a logging instrument 23 which is employed to traverse the borehole 21. Included in the instrument 23 is a primary radiation source 24 for emitting bursts of primary radiation and first and second detectors 25 and 26 longitudinally spaced from source 24 respectively by distances $r_1$ and $r_2$ for detecting simultaneously secondary radiation of the same nature passing from the formations into the borehole. The outputs of detectors 25 and 26 are applied to the surface where measurements are made of the secondary radiation detected by the two detectors. From these measurements quantities, such as the lifetime or decay constant of the secondary radiation such as thermal neutrons detected at each detector, are obtained. More particularly, the decay constant of thermal neutrons detected by one detector is compared with the decay constant of thermal neutrons detected by the other detector to obtain a difference function. In the present invention, the difference between the two decay constants is obtained to reduce the effect of chlorine and therefore to obtain a measure primarily of porosity.

More particularly, the thermal neutron decay constant measured at a single detector may be said to be comprised of two components, an absorptive component and a component (the diffusive component) which is dependent primarily on the hydrogen content. For example, it can be shown that the thermal neutron decay constant $\lambda$, measured at a distance $r$ from a source of fast neutrons in an infinite uniform medium, may be expressed by the following relationship:

$$\lambda = \lambda_a + \frac{vD}{2\theta}\left(3 - \frac{r^2}{2\theta}\right) \quad (1)$$

where:

$v$ is the thermal neutron velocity (0.22 centimeter per microsecond);
D is the thermal diffusion coefficient;
$\theta$ is the symbolic age; and
$\lambda_a$ is the absorptive decay constant.

Equation 1 results from an application of age theory, as developed in The Elements of Nuclear Reactor Theory by Samuel Glasstone and Milton Edlund, D. Van Nostrand Company, Inc., New York, p. 180, together with an approximate solution of the time dependent diffusion equation as disclosed by Collie, Meads, and Lockett in "The Capture Cross Section of Neutrons by Boron," Proceedings of Physical Society, volume 69, p. 464, 1956.

In Equation 1

$$\frac{vD}{2\theta}\left(3 - \frac{r^2}{2\theta}\right)$$

is dependent upon porosity since the thermal diffusion coefficient and the symbolic age vary primarily with change in hydrogen content and hence with change in the porosity as will become apparent hereinafter. The absorptive component $\lambda_a$ on the other hand varies both with changes in salinity and in porosity and strongly influences $\lambda$. More particularly, $\lambda_a$ may be expressed by the following relationship:

$$\lambda_a = v\Sigma_a \quad (2)$$

wherein $\Sigma_a$ is the macroscopic absorption cross section which, for a mixture of $n$ elements, may be expressed in the following manner:

$$\Sigma_a = \sum_{i=1}^{n} N_i \sigma_{ai}^{th} \quad (3)$$

$N_i$ being the number of $i$ atoms per cm.$^3$ and $\sigma_{ai}^{th}$ being the thermal neutron-capture cross section of the $i$th type element.

From Equation 3, it can be shown that both salinity and porosity strongly affect $\lambda_a$ and therefore $\lambda$ as measured by a single detector. Furthermore, $\lambda_a$ and therefore $\lambda$ may be the same in formations of high porosity and low salinity and formations of high salinity and low porosity. This is due to the fact that the macroscopic cross sections for both types of formations may be the same. For further explanation, reference is made to the curves of FIGURE 2, expected to be obtained in different formations by a single detector. These curves show a large value of $\tau$ (500 microseconds) at 25% porosity and zero salinity and at 5% porosity and 20% salinity. Thus, it is difficult, if not impossible, to distinguish the two formations by merely measuring the lifetime or decay constant at only one detector.

In accordance with the present invention, the lifetime or decay constant of thermal neutrons is measured at two spaced detectors and the difference obtained to eliminate the absorptive decay component, thereby obtaining a measurement primarily indicative of porosity. More particularly, the decay constants $\lambda_1$ and $\lambda_2$, as obtained respectively from the detectors 25 and 26, may be expressed respectively by the following equations:

$$\lambda_1 = \lambda_a + \frac{vD}{2\theta}\left(3 - \frac{r_1^2}{2\theta}\right) \quad (4)$$

$$\lambda_2 = \lambda_a + \frac{vD}{2\theta}\left(3 - \frac{r_2^2}{2\theta}\right) \quad (5)$$

wherein $r_1$ and $r_2$ are the distances that detectors 25 and 26 are spaced from the neutron source.

Upon analysis of $\lambda_1$ and $\lambda_2$ of Equations 4 and 5 obtained with the source and detectors 25 and 26 located opposite the same formation, it can be seen that $\lambda_a$ at each detector will be the same. Moreover, in the same formation the components $$\frac{vD}{2\theta}\left(3 - \frac{r_1^2}{2\theta}\right)$$

and $$\frac{vD}{2\theta}\left(3 - \frac{r_2^2}{2\theta}\right)$$

will differ due only to the effect of the difference in $r_1$ and $r_2$. Moreover, D and $\theta$ vary primarily with porosity as mentioned previously. Thus, by forming the difference between $\lambda_1$ and $\lambda_2$, one is able to eliminate substantially the absorptive component and obtain a measurement primarily of porosity.

The difference between Equations 4 and 5 may be expressed in the following manner:

$$\frac{4}{v}\left(\frac{\lambda_1 - \lambda_2}{r_2^2 - r_1^2}\right) = \frac{D}{\theta^2} \quad (6)$$

wherein $D/\theta^2$ has units of cm.$^{-3}$

Since $$\frac{4}{v}\left(\frac{1}{r_2^2 - r_1^2}\right)$$

is known, by measuring $\lambda_1 - \lambda_2$ one obtains a measurement representative of $D/\theta^2$ and hence primarily of porosity.

Figure 3:
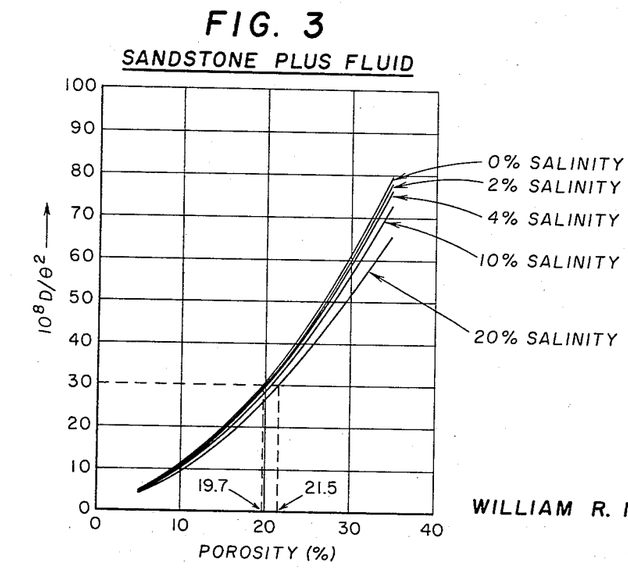
FIGURE 3 illustrates curves which reflect the difference between two decay constants expected to be measured by two detectors at two different locations relative to the source.

Reference is also made to the curves of FIGURE 3 which illustrate the variation of $D/\theta^2$ with salinity and porosity as expected with a dual detector system. As can be seen from FIGURE 3, a measurement of $D/\theta^2$, as obtained with a dual detector system, determines an approximately unique value of porosity almost independent of salinity. This can be readily understood from the small spread in the curves over a large range of salinity.

Figure 2:
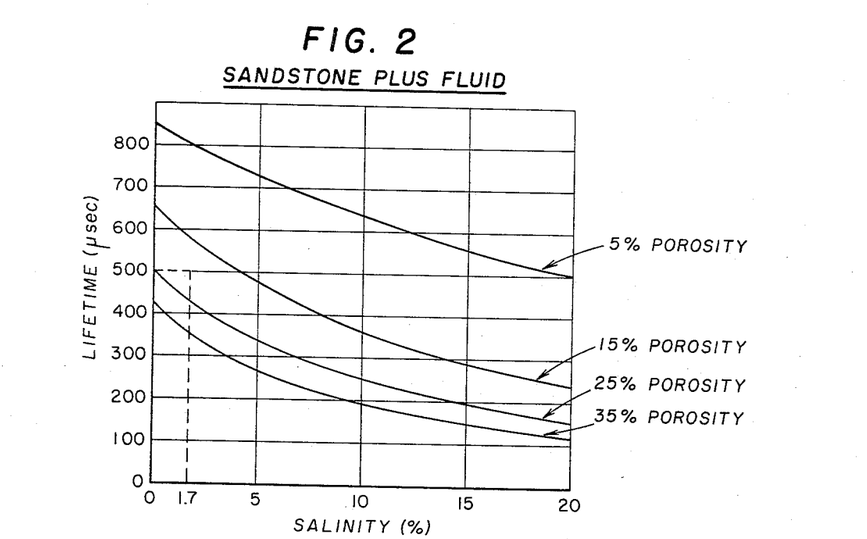
FIGURE 2 illustrates curves which reflect the thermal neutron lifetime expected in various formations at a single detector.

Referring again to FIGURE 1, the dual detector system and method for measuring $\tau$ or $\lambda$ for obtaining measurements primarily of porosity and independent of salinity will be described in further detail. In the measurement of thermal neutrons, source 24 employed is a pulsed neutron source and detectors 25 and 26 are thermal neutron detectors such as helium-3 proportional counters of the type disclosed and claimed in U.S. Patent No. 3,102,198. The outputs of detectors 25 and 26 are applied to the uphole analyzing system wherein the decay constants of thermal neutrons detected at each detector are measured and the difference therebetween formed in order to obtain measurements primarily indicative of porosity. In the preferred embodiment, the analyzing system comprises instrumentation for obtaining the desired measurements continuously and automatically as the instrument 23 is moved along the borehole. This instrumentation, as will be described hereinafter, includes recorder 27 and either one of recorders 28 or 29, the charts of which are driven in correlation with depth by sheave 30 and mechanical connection 31. Recorder 27 continuously and in correlation with depth records trace 32 which is representative of the difference between the two decay constants of the thermal neutrons detected by detectors 25 and 26. The traces 33 and 34 recorded respectively by recorders 28 and 29 are representative of the lifetime of thermal neutrons detected by detectors 25 and 26. In actual practice, calibration curves similar to those of FIGURES 2 and 3 are obtained from calibration measurements. Trace 32 is employed with the calibration curves of FIGURE 3 to determine porosity at a given depth. The value of porosity obtained from the curves of FIGURE 3 and the mean lifetime as reflected preferably by trace 34 at the same depth are then employed with the calibration curves of FIGURE 2 to determine salinity.

More particularly, at a certain depth, $D/\theta^2$ as reflected by trace 32 may have a value proportional to $30 \times 10^{-8}$ cm.$^{-3}$ As can be seen from FIGURE 3, at this value the porosity is between 19.7 and 21.5 percent and has a median value of 20.6 percent. At the same depth the value of the thermal neutron lifetime as reflected by trace 34 may be 500 microseconds. As can be seen from FIGURE 2, if the thermal neutron lifetime is 500 microseconds and the porosity is 20.6 percent, the salinity is about 1.7 percent. Thus, it can be understood now that the dual detector system of the present invention can be employed to accurately determine both salinity and porosity.

Referring more particularly to the instrumentation employed to carry out the measurements, an oscillator 35 is provided in the borehole tool 23 to generate periodic trigger pulses. These pulses trigger a phantastron pulse generator 36 to actuate the neutron source 24 for the production of bursts of neutrons. The trigger pulses from oscillator 35 also are applied to trigger the uphole instrumentation. More particularly, the pulses from oscillator 35 are applied to the surface by way of amplifier 37 and conductor 38 of cable 39 which is wound and unwound upon a drum 40 driven by motor 41 and mechanical connection 42. At the surface, pulses are taken from conductor 38 by way of slip ring 43 and brush 44 which are part of a plurality of slip rings and brushes (not shown). These pulses are applied by way of amplifier 45 and delay 46 to trigger two single channel time analyzers illustrated by the dotted lines 47 and 48. The outputs of detectors 25 and 26 also are applied respectively to time analyzers 47 and 48 by way of borehole amplifiers 49 and 50, conductors 51 and 52 and surface amplifiers 53 and 54.

Figure 4:
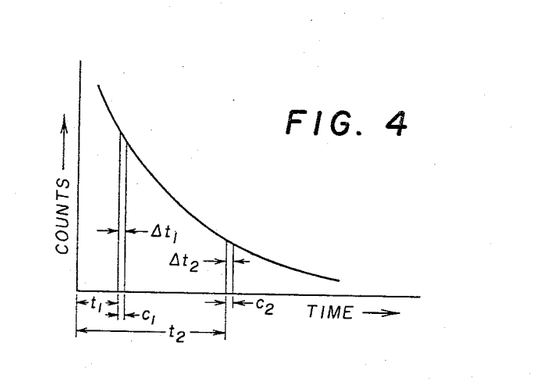
FIGURE 4 illustrates a decay curve useful in understanding the present invention.

Time analyzers 47 and 48 each are employed to obtain measurements of the thermal neutrons detected at each detector within two time periods following each burst of primary radiation. These measurements are employed in the following equation in order to obtain measurements of the decay constants $\lambda_1$ and $\lambda_2$ of thermal neutrons detected respectively by detectors 25 and 26:

$$\lambda = \frac{\ln\left(\frac{C_1}{C_2}\right)}{t_2 - t_1} = \frac{1}{\tau} \qquad (7)$$

wherein, referring to FIGURE 4:

$C_1$ and $C_2$ are the cumulative counts observed respectively within equal time periods $\Delta t_1$ and $\Delta t_2$ within a plurality of cycles beginning respectively at $t_1$ and $t_2$ following a time zero, which may be the end of each burst of irradiation; and ln is the natural logarithm.

More particularly, time analyzers 47 and 48 each select detector pulses representative of thermal neutrons detected within two separate time periods following each burst of primary radiation. For example, analyzer 47 selects pulse representative of thermal neutrons detected by detector 25 within $\Delta t_1$ and $\Delta t_2$ (FIGURE 4). Output functions representative of the thermal neutrons detected within $\Delta t_1$ and $\Delta t_2$ then are applied respectively to logarithmic count rate meters 55 and 56 coupled to a difference circuit 57. The output of difference circuit 57 which is equal to $\ln C_1 - \ln C_2$ or $\ln (C_1/C_2)$, is representative of $\lambda_1$ since $t_2$ and $t_1$ are maintained constant. For further discussion of such a system for automatically measuring the decay constant, reference may be had to my copending U.S. patent application, Serial No. 326,791, filed November 29, 1963.

Similarly, time analyzer 48 produces output functions representative of the thermal neutrons detected by detector 26 within a second set of equal time periods following each burst of fast neutrons. The second set of time periods may occur respectively at the same times or at different times from the time of occurrence of the first set of time periods associated with analyzer 47 and in addition may be of duration equal to or different from that of the first set of time periods. The output functions from analyzer 48 are applied respectively to logarithmic count rate meters 58 and 59 coupled to difference circuit 60. The output of difference circuit 60 thus is representative of the decay constant of the thermal neutrons detected by detector 26. The outputs of difference circuits 57 and 60 are applied to difference circuit 61 coupled to recorder 27 for the production of trace 32 representative of $\lambda_1 - \lambda_2$. In addition, the outputs of difference circuits 57 and 60 are inverted respectively at 62 and 63 and applied to recorders 28 and 29 for the production of traces 33 and 34 representative of the lifetime of thermal neutrons detected by detectors 25 and 26. The traces recorded are utilized to determine porosity and salinity in the manner hereinbefore described.

There now will be described the single channel time analyzers 47 and 48 employed for selecting pulses representative of thermal neutrons detected within two time periods following each burst of primary radiation. Since analyzers 47 and 48 are similar, only analyzer 47 will be described. This analyzer comprises a time-to-pulse height converter 70, saw-tooth wave and gate pulse generator 71, periodically actuated by trigger pulses from delay circuit 46, and two single channel pulse height analyzers 72 and 73. The time-to-pulse height converter 70 produces pulses having heights proportional to the time that radiation is detected following the start of a saw-tooth wave. These pulses are selected according to height by analyzers 72 and 73 to select radiation detected by detector 25 respectively within $\Delta t_1$ and $\Delta t_2$. In the operation of the time analyzer 47, a saw-tooth or time-varying voltage from generator 71 is generated following each burst of primary radiation and is applied to converter 70 by way of conductor 74. The amplitude of the saw-tooth voltage applied to converter 70 is sampled by sampling pulses, which are the detector pulses applied by way of amplifier 53. A gate is employed in the converter 70 for accepting sampling pulses only during the rising part of the saw-tooth voltage. This gate is opened only during this time by a positive gate pulse applied thereto by conductor 75 extending from saw-tooth and gate pulse generator 71. The output of the converter 70 comprises pulses having magnitudes proportional to that of the saw-tooth voltage at the time of sampling. These output pulses thus have a magnitude proportional to time referred to the start of the saw-tooth voltage as time zero. To make the system only responsive to detector pulses which appear within the time period $\Delta t_1$ and $\Delta t_2$, beginning respectively at $t_1$ and $t_2$, the pulse height analyzers 72 and 73 are adjusted to be responsive to pulses from the converter 70 within a certain pulse height range. For example, in the operation of analyzer 72, the adjustment is accomplished by varying the threshold control 76 and window width control 77. Analyzer 73 is adjusted in a similar manner to be responsive to pulses detected only within $\Delta t_2$.

In the above description, the difference between the decay constants was formed to obtain measurements of porosity; however, it is to be understood that the lifetimes of the radiation detected by each detector may be combined to obtain similar results.

Instead of directly recording the difference between the decay constants, it is to be understood that intensity traces or curves can be obtained and the decay constants manually calculated from these traces or curves. For example, the outputs from analyzers 72 and 73 may be applied respectively to count rate meters 80 and 81. The outputs of these meters are coupled to recorder 82 for the production of two traces 83 and 84 representative of the intensity of thermal neutrons detected by detector 25 within the two time periods $\Delta t_1$ and $\Delta t_2$ following each burst of primary radiation. In a similar manner, the outputs of single channel pulse height analyzers 85 and 86 are applied to count rate meters 87 and 88 coupled to recorder 89 for the production of two traces 90 and 91 representative of the intensity of thermal neutrons detected by detector 26 within two time periods following each burst of primary radiation. The charts of recorders 82 and 89 are both driven in correlation with depth by mechanical connections 92 coupled in a manner (not shown) to sheave 30. As can be understood by one versed in the art, the decay constants at each depth may be manually calculated from values obtained from curves 83, 84, 90, and 91 and applied in Equation 7 and then subtracted from each other to obtain porosity measurements.

In another embodiment, time decay curves may be obtained and the decay constants determined from such curves. More particularly, referring to FIGURE 5, the pulses from detector 25 may be applied by way of amplifier 53 to multichannel time analyzer 93 while pulses from detector 26 may be applied by way of amplifier 54 to multichannel time analyzer 94. In addition, the trigger pulses from delay circuit 46 also are applied to multichannel time analyzers 93 and 94. Analyzers 93 and 94 each have a plurality of windows, each of which sequentially opens and closes to accept pulses respectively from detectors 25 and 26. Pulses accepted by each window are summed and sequentially supplied to the read outs 95 and 96 for the production of decay curves 97 and 98 representative of the time distribution of thermal neutrons detected. From curves 97 and 98 the decay constants can be calculated or determined and the difference obtained to obtain measurements primarily of porosity. The depth at which the logging operations are carried out is read from depth meter 99 coupled to cable measuring element 30 by way of mechanical connection 31.

Now that there have been described several embodiments of the dual detector system for measuring the difference between $\lambda$ or $\tau$ obtained at each detector to obtain measurements of porosity, there will be described other components and modifications of the well logging system. More particularly, referring again to FIGURE 1, a power supply 100 is provided in the instrument 23 for supplying power to all of the components in the tool, although it is illustrated as being coupled only to source 24. Conductors 101 and 102, which pass through cable 39, are provided for supplying energizing power to power supply 100.

The neutron source 24 comprises an ion source 103 of deuterium and a target 104 of tritium. Trigger pulses of positive polarity periodically are applied to the deuterium ion source 103 for ionizing the deuterium. The deuterium ions produced are accelerated to the target 104 by a high negative voltage applied thereto by power supply 100 and conductor 105. The reaction between the deuterium ions and the tritium produces neutrons with energy of 14.3 Mev. which then irradiate the adjacent formations. The detectors 25 and 26 may be shielded from direct radiation from source 24 by shield 106.

Figure 6:
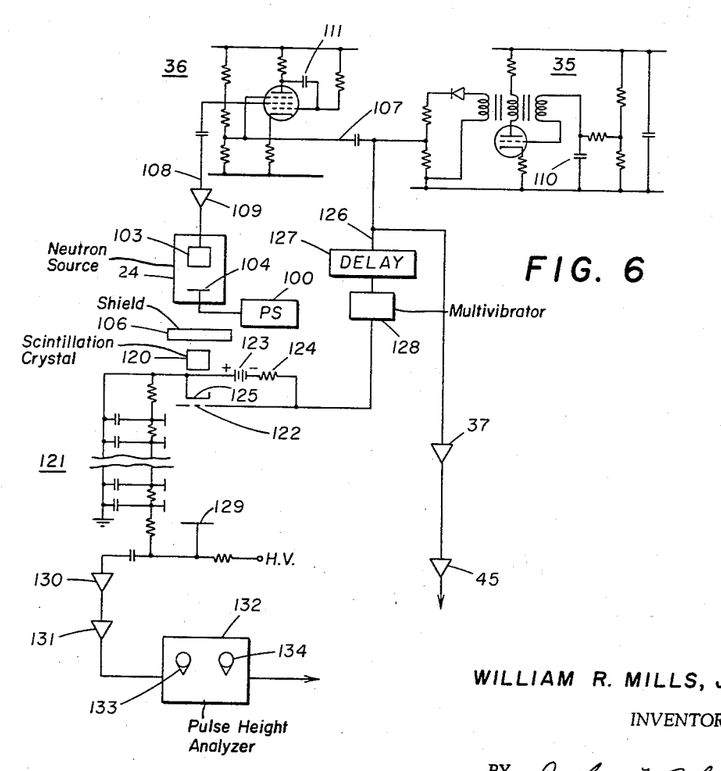
FIGURE 6 illustrates a system which may be employed in the well logging system of FIGURE 1 to detect and measure gamma radiation.

The pulses for ionizing the deuterium are obtained from blocking oscillator 35 and phantastron 36. More particularly, the blocking oscillator produces sharp trigger pulses which are applied by way of conductor 107 (FIGURE 6) to trigger phantastron 36. The phantastron produces pulses of predetermined width which are applied by way of conductor 108 and amplifier 109 to the ion source 103. The frequency and width of the pulses applied to the ion source may be varied by varying the values of capacitors 110 and 111 respectively of oscillator 35 and phantastron 36, as understood by those skilled in the art.

If thermal neutron lifetime is being measured, the repetition rate of the neutron bursts may be of the order of 200–500 pulses per second, the width of each pulse being of the order of 50–100 microseconds. In the embodiments where continuous measurements are made, the $\Delta t$ time periods may be of the order of 100 microseconds, spaced from the end of each burst of primary radiation at desirable time intervals. Detector 25 may be spaced about fifteen inches from source 24 while detector 26 may be spaced from source 24 by about twenty-five inches. For continuous measurement the logging tool 23 may be passed along the borehole at a speed of twenty-five feet per minute.

In the above system, there was described the measurement of the decay constant or lifetime of thermal neutrons; however, it is to be understood that decay or lifetime measurements can be obtained of neutron-capture gamma rays to obtain similar information. In other words, the lifetime of neutron-capture gamma rays varies in a manner similar to that of thermal neutrons as can be understood by those versed in the art and thus can be employed in a similar manner to obtain information about salinity and porosity. More particularly, referring to FIGURE 6, a gamma ray detecting system is provided which comprises a scintillation crystal 120 coupled to a photomultiplier tube 121. The photomultiplier tube 121 may be normally biased to cut off during the time that the neutron generator is pulsed to prevent the high intensity radiation present during this time from affecting the gain of the tube. After the end of each burst of neutron radiation, the tube 121 is energized to an operative condition for the production of output pulses in response to the radiation detected by crystal 120. A negative potential with respect to the cathode 125 normally is applied to the shield grid 122 to bias the tube to cut off. This potential is supplied by source 123 connected to resistor 124, both of which are coupled between the grid 122 and cathode 125. The trigger pulses produced by blocking oscillator 35 are utilized in the production of a positive voltage of a magnitude sufficient to overcome the bias on the tube 121. These trigger pulses are applied by way of conductor 126 to delay circuit 127. The output of this circuit triggers a mono stable multivibrator 128. When triggered, a positive pulse is produced by multivibrator 128 which is then applied to shield grid 122 to overcome the bias and render the tube 121 in an operative condition for a predetermined time period with each trigger pulse. The output pulses from the anode 129 of tube 121 have heights proportional to the energy of the gamma rays detected and are applied by way of amplifiers 130 and 131 to a single channel analyzer 132 employed at the surface. This analyzer is adjusted by adjustment of threshold control 133 and window width control 134 to be responsive only to gamma rays detected within a desired energy range. The output of analyzer 132 may then be applied to the time analyzers, for example analyzers 47 and 48, for the production of the desired measurement.

In one embodiment, the neutron generator 24 may be of the type manufactured by N.V. Philips, Gloeilampenfabrieken, Eindhoven, Netherlands, Model No. 285, distributed in the United States by Norelco, 750 S. Fulton Ave., Mount Vernon, N.Y. The difference circuits 57, 60, and 61 may be of the type illustrated on page 248 of Electron Tube Circuits, Samuel Sealey, McGraw-Hill Book Company, 1958, second edition. The log count rate meters 55, 56, 58, and 59 may be of the type manufactured by Victoreen Instrument Company, Cleveland, Ohio, Model No. CRM–3C. The pulse height analyzers 72, 73, 85, 86, and 132 may be of the type manufactured by Hamner Electronics Company, Inc., Princeton, N.J., Model No. N–603. The multichannel time analyzers 93 and 94 may be of the type manufactured by the Technical Measurement Corp., North Haven, Conn., Model CN–110 including a plug-in model 211, Time-of-Flight Logic Circuit. The saw-tooth and gate pulse generator 71 may by a type 531 Textronix oscilloscope. The time-to-pulse height converter 70 may be of the type described in "Time-to-Pulse Height Converter of Wide Range" by Joachim Fischer and Arne Lundby, The Review of Scientific Instruments, volume 31, No. 1, January 1960.

Now that the invention has been described, modifications will become apparent to those skilled in the art, and it is intended to cover such modifications as fall within the scope of the appended claims.

What is claimed is:

1. A method of investigating formations traversed by a borehole for two parameters of interest and of a different nature comprising the steps of passing into the borehole a logging tool containing a source of primary radiation, irradiating the formations with bursts of primary radiation spaced in time for the production of secondary radiation, at a first location spaced from the source detecting secondary radiation passing from the formations into the borehole, at a second location spaced from the source by a different distance detecting secondary radiation passing from the formations into the borehole, producing in correlation with depth a first measurement representative of the secondary radiation detected at the first location following each burst of primary radiation, producing in correlation with depth a second measurement representative of the secondary radiation detected at the second location following each burst of primary radiation, from the first and second measurements producing first and second functions characterizing the secondary radiation detected respectively at the first and second locations, recording a third function representative of the difference between the first and second functions to obtain a measurement of one of the parameters of interest, and from one of the first and second measurements recording a function characterizing the secondary radiation detected at one of said locations for comparison with the parameter measured for obtaining information about the other of the two parameters of interest.

2. A method of investigating formations traversed by a borehole for two parameters of interest and of a different nature comprising passing into the borehole a logging tool containing a source of primary radiation, irradiating the formations with bursts of primary radiation spaced in time for the production of secondary radiation, at a first location spaced from the source detecting secondary radiation passing from the formations into the borehole, at a second location spaced from the source by a different distance simultaneously detecting secondary radiation of the same nature passing from the formations into the borehole, producing a first measurement representative of the secondary radiation detected at the first location within at least two separate time periods following each burst of primary radiation, producing a second measurement representative of the secondary radiation detected at the second location within two time periods following each burst of primary radiation, from the first and second measurements producing first and second functions dependent upon the rate of decay of the secondary radiation detected respectively at the first and second locations, producing a third function representative of the difference between the first and second functions to obtain measurements of one of the parameters of interest, and from at least one of the first and second measurements producing a function representative of the lifetime of secondary radiation detected by one of the detectors for comparison with the parameter measured for obtaining information about the other of the two parameters of interest.

3. A method of obtaining information from formations traversed by a borehole comprising the steps of passing into the borehole a logging tool containing a source of neutrons, irradiating the formations with bursts of fast neutrons for the production of thermal neutrons, at a first location spaced from the source detecting thermal neutrons passing from the formations into the borehole, at a second location spaced from the source by a different distance simultaneously detecting thermal neutrons passing from the formations into the borehole, in response to the thermal neutrons detected at the first location producing a first measurement representative of the thermal neutrons detected within at least two separate time periods following each burst of fast neutrons, in response to the thermal neutrons detected at the second location producing a second measurement representative of the thermal neutrons detected within at least two separate time periods following each burst of fast neutrons, from the first and second measurements producing first and second functions representative of the decay constant of the thermal neutrons detected respectively at the first and second locations, producing a first function representative of the difference between the third and second functions to obtain measurements primarily of porosity, and from at least one of the first and second measurements producing a function representative of the lifetime of thermal neutrons detected by one of the detectors for comparison with the porosity measured for obtaining information about the salinity of the formations.

4. A method of investigating formations traversed by a borehole for a parameter of interest comprising the steps of:
  repetitively irradiating the formations with bursts of primary radiation spaced in time for the production of secondary radiation,
  within a plurality of separate time periods following each of a plurality of predetermined bursts of primary radiation detecting secondary radiation passing from the formations into the borehole by way of a path through the formations of a first distance,
  within a plurality of separate time periods following each of a plurality of predetermined bursts of primary radiation detecting secondary radiation of the same nature passing from the formations into the borehole by way of a path through the formations of a second and different distance,
  producing a first function independent of the absolute count rate and dependent upon the rate of decay of secondary radiation traversing said first-named path and detected following each of said plurality of predetermined bursts of primary radiation, and
  producing a second function independent of the absolute count rate and dependent upon the rate of decay of secondary radiation traversing said second-named path and detected following each of said plurality of predetermined bursts of primary radiation for comparison with said first function to obtain a measure of said parameter of interest.

5. A method of investigating formations traversed by a borehole for a parameter of interest comprising the steps of:
 passing into the borehole a logging tool containing a source of primary radiation,
 repetitively irradiating the formations with bursts of primary radiation spaced in time for the production of secondary radiation,
 within a plurality of separate time periods following each of a plurality of predetermined bursts of primary radiation and at a first location spaced from the source detecting secondary radiation passing from the formations into the borehole,
 within a plurality of separate time periods following each of a plurality of predetermined bursts of primary radiation and at a first location spaced from the source by a different distance detecting secondary radiation of the same nature passing from the formations into the borehole,
 producing a first function independent of the absolute count rate and dependent upon the rate of decay of the secondary radiation detected at the first location following each of said plurality of predetermined bursts of primary radiation, and
 producing a second function independent of the absolute count rate and dependent upon the rate of decay of the secondary radiation detected at the second location following each of said plurality of predetermined bursts of primary radiation for comparison with said first function to obtain a measure of said parameter of interest.

6. A method of investigating formations traversed by a borehole for a parameter of interest comprising the steps of:
 passing into the borehole a logging tool containing a source of primary radiation,
 repetitively irradiating the formations with bursts of primary radiation spaced in time for the production of secondary radiation,
 at a first location spaced from said source detecting secondary radiation passing from the formations into the borehole,
 at a second location spaced from the source by a different distance detecting secondary radiation of the same nature passing from the formations into the borehole,
 producing first measurements representative of the secondary radiation detected at said first location within at least two separate time periods following each of a plurality of predetermined bursts of primary radiation,
 producing second measurements representative of the secondary radiation detected at said second location within at least two separate time periods following each of a plurality of predetermined bursts of primary radiation,
 employing said first measurements to obtain a first function which is a function of the relative quantity of secondary radiation detected at said first location within said corresponding two separate time periods, and
 employing said second measurements to obtain a second function which is a function of the relative quantity of secondary radiation detected at said second location within said corresponding two separate time periods for comparison with said first function to obtain measurements of said parameter of interest.

7. The method of claim 6 wherein:
 said formations are irradiated with bursts of fast neutrons spaced in time,
 said first and second functions being dependent upon the rate of decay of secondary radiation detected at said first and second locations, respectively,
 said first and second functions being combined to obtain a measurement representative of the difference between said first and second functions and indicative primarily of porosity.

8. The method of claim 7 wherein said first and second functions each is a function of $$\frac{\ln \frac{C_1}{C_2}}{t_2 - t_1}$$

wherein:
 $C_1$ and $C_2$ are representative of the cumulative quantity of secondary radiation detected at each of said first and second locations within first and second spaced-apart and equal time periods beginning, respectively, at separate time intervals $t_1$ and $t_2$ following each burst of fast neutrons, and ln is the natural logarithm.

9. The method of claim 7 wherein:
 thermal neutrons are detected at said first and second locations.

10. The method of claim 7 wherein:
 thermal neutron capture gamma rays are detected at said first and second locations.

11. The method of claim 7 wherein:
 said first measurements comprise a set of separate measurements representative of the secondary radiation detected at said first location within at least two separate time periods, respectively, following each of a plurality of predetermined bursts of primary radiation,
 said second measurements comprising a set of separate measurements representative of the secondary radiation detected at said second location within at least two separate time periods, respectively, following each of a plurality of predetermined bursts of primary radiation.

12. The method of claim 11 wherein:
 said logging tool is moved continuously through the borehole during the period of investigation,
 the formations being irradiated with bursts of fast neutrons and secondary radiation at said first and second locations being detected during said movement of said tool through the borehole,
 said first and second measurements comprising said sets of separate meaurements, respectively, said first and second functions, and said measurement indicative of porosity being produced continuously during said movement of said tool through the borehole.

13. A method of investigating formations traversed by a borehole for a parameter of interest comprising the steps of:
 irradiating the formations with bursts of primary radiation spaced in time for the production of secondary radiation,
 detecting secondary radiation passing from the formations into the borehole by way of a path through formations of a first distance,
 detecting secondary radiation of the same nature passing from the formations into the borehole by way of a path through the formations of a second and different distance,
 producing first measurements representative of secondary radiation traversing said first-named path and detected within at least two separate time periods following each of a plurality of bursts of primary radiation,
 producing second measurements representative of the secondary radiation traversing said second-named path and detected within at least two separate time periods following each of a plurality of bursts of primary radiation, employing said first measurements to obtain a first function which is a function of the ratio of the quantity of secondary radiation traversing said first-named path and detected within said corresponding two separate time periods, and employing said second measurements to obtain a second function which is a function of the ratio of the quantity of secondary radiation traversing said second-named path and detected within said corresponding two separate time periods for comparison with said first function to obtain a measurement of said parameter of interest.

14. A method of investigating formations traversed by a borehole for a parameter of interest comprising the steps of:

passing into the borehole a logging tool containing a source of primary radiation, periodically irradiating the formations with bursts of primary radiation spaced in time thereby defining successive cycles of operation, at a first location spaced from said source detecting secondary radiation passing from the formations into the borehole, at a second location spaced from the source by a different distance detecting secondary radiation of the same nature passing from the formations into the borehole, producing first measurements representative of the secondary radiation detected at said first location within at least two separate and different time periods each occurring within a plurality of cycles of operations, producing second measurements representative of the secondary radiation detected at said second location within at least two separate and different time periods each occurring within a plurality of cycles of operation, employing said first measurements to obtain a first function which is independent of the absolute count rate and dependent upon the rate of decay of secondary radiation detected at said first location within said corresponding two time periods within a plurality of cycles, and employing said second measurements to obtain a second function which is independent of the absolute count rate and dependent upon the rate of decay of secondary radiation detected at said second location within said corresponding two time periods within a plurality of cycles for comparison with said first function to obtain a measurement of said parameter of interest.

15. The method of claim 14 wherein:

said first measurements comprise a set of separate measurements representative, respectively, of the secondary radiation detected at said first location within at least two separate and different time periods each occurring within a plurality of cycles of operation, said second measurements comprising a set of separate measurements representative, respectively, of the secondary radiation detected at said second location within at least two separate and different time periods each occurring within a plurality of cycles of operation, said first and second functions being combined to obtain a measurement representative of the difference between said first and second functions.

16. The method of claim 15 wherein:

said logging tool is moved continuously through the borehole during the period of investigation, said first and second measurements comprising said sets of separate measurements, respectively, said first and second functions, and said difference measurement being produced continuously during said movement of said tool through the borehole.

References Cited

UNITED STATES PATENTS

| | | | |
|---|---|---|---|
| 2,508,772 | 5/1950 | Pontecorvo | 250—83.6 |
| 3,061,725 | 10/1962 | Green | 250—83.6 |
| 2,991,364 | 7/1961 | Goodman | 250—71.5 |

ARCHIE R. BORCHELT, *Primary Examiner.*

UNITED STATES PATENT OFFICE
CERTIFICATE OF CORRECTION

Patent No. 3,373,280    March 12, 1968

William R. Mills, Jr.

It is hereby certified that error appears in the above numbered patent requiring correction and that the said Letters Patent should read as corrected below.

Column 6, line 19, for "pulse" read -- pulses --; column 8, line 71, for "mono stable" read -- monostable --; column 10, line 44, for "first" read -- third --; line 45, for "third" read -- first --; column 11, line 21, for "first" read -- second --.

Signed and sealed this 10th day of June 1969.

(SEAL)
Attest:

Edward M. Fletcher, Jr.    WILLIAM E. SCHUYLER, JR.
Attesting Officer    Commissioner of Patents